(12) United States Patent
Schmauder

(10) Patent No.: US 11,090,699 B2
(45) Date of Patent: Aug. 17, 2021

(54) GPS LOCATING AND MAPPING WITH DISTANCE OVERLAY FOR DRAIN CLEANING AND INSPECTION EQUIPMENT

(71) Applicant: Ridge Tool Company, Elyria, OH (US)

(72) Inventor: Christopher Schmauder, North Olmstead, OH (US)

(73) Assignee: Ridge Tool Company, Elyria, OH (US)

( * ) Notice: Subject to any disclaimer, the term of this patent is extended or adjusted under 35 U.S.C. 154(b) by 77 days.

(21) Appl. No.: 16/276,870

(22) Filed: Feb. 15, 2019

(65) Prior Publication Data

US 2019/0255579 A1    Aug. 22, 2019

Related U.S. Application Data

(60) Provisional application No. 62/632,649, filed on Feb. 20, 2018.

(51) Int. Cl.
*B08B 9/043*    (2006.01)
*B08B 13/00*   (2006.01)
*G01S 19/13*   (2010.01)

(52) U.S. Cl.
CPC .............. *B08B 9/043* (2013.01); *B08B 13/00* (2013.01); *B08B 2209/04* (2013.01); *G01S 19/13* (2013.01)

(58) Field of Classification Search
USPC ........................................................ 701/409
See application file for complete search history.

(56) References Cited

U.S. PATENT DOCUMENTS

| 7,503,134 B2 * | 3/2009 | Buckner ............... E01H 1/0827 |
| | | 15/300.1 |
| 7,889,980 B2 | 2/2011 | Sooy |
| 8,046,862 B2 | 11/2011 | Eisermann et al. |
| 8,276,593 B2 | 10/2012 | Jones et al. |
| 8,413,347 B2 | 4/2013 | Gress et al. |
| 2003/0035685 A1 * | 2/2003 | Schmitt .................. B08B 9/045 |
| | | 403/322.1 |
| 2007/0226945 A1 * | 10/2007 | McIntyre ................ A47L 5/365 |
| | | 15/327.6 |
| 2008/0264456 A1 * | 10/2008 | Lynch ...................... B08B 1/04 |
| | | 134/105 |
| 2009/0292502 A1 * | 11/2009 | Gress ..................... B08B 9/045 |
| | | 702/163 |
| 2014/0316614 A1 * | 10/2014 | Newman ............... B64C 39/024 |
| | | 701/3 |
| 2018/0035606 A1 * | 2/2018 | Burdoucci ............. A01D 43/14 |
| 2019/0255579 A1 * | 8/2019 | Schmauder ............ B08B 13/00 |
| 2020/0271478 A1 * | 8/2020 | Schmauder ........... B08B 9/0436 |

OTHER PUBLICATIONS

SR-24 LINE LOCATOR, 7 pages.
SeekTech Operator's Manual SR Locators SR-24; 2017; 64 pages.

* cited by examiner

*Primary Examiner* — Tyler D Paige
(74) *Attorney, Agent, or Firm* — Mark E. Bandy; Rankin Hill & Clark, LLP

(57) ABSTRACT

Drain cleaning and inspection machines, systems and methods are described. The systems and methods utilize a GPS-enabled drain cleaner to collect information during drain cleaning or inspection, forward that information to a host server at which various processing and imagery generation occurs, and providing a detailed map and/or report.

17 Claims, 6 Drawing Sheets

GPS LOCATING AND MAPPING WITH DISTANCE OVERLAY FOR DRAIN CLEANING AND INSPECTION EQUIPMENT

CROSS REFERENCES TO RELATED APPLICATIONS

This application claims priority from U.S. provisional application Ser. No. 62/632,649 filed on Feb. 20, 2018.

FIELD

The present application relates to drain cleaning and inspection, and systems and methods related thereto. Such systems include drum drain cleaners, sectional drain cleaners, high pressure hose jetters, camera systems, and locating systems.

BACKGROUND

Typically, drain cleaners are passive systems that do not provide feedback to a user, company, or customer. Drum drain cleaner machines typically include a frame, a rotatable drum, a cable, and a motor. Other than counters which count revolutions of the drum to estimate cable length advanced, a user typically relies upon his or her experience to assess drain or pipe line orientation and direction. Recent developments have described improvements in cable counting and drain mapping in various fashions, see for example U.S. Pat. No. 7,889,980 to Sooy; U.S. Pat. No. 8,046,862 to Eisermann et al.; U.S. Pat. No. 8,276,593 to Gress et al.; U.S. Pat. No. 8,413,347 to Gress et al.; and U.S. provisional application Ser. No. 62/592,762 to Schmauder et al. These features aid the user in determining cable progression or regression along with identifying points of interest which may be a bend or obstruction for example. Currently, known hose jetters do not provide feedback for their users and are currently devoid of any smart features.

In the field of drain inspection and line locating, currently known systems utilize distance counting techniques along with line locating. These features allow the user to "see" the drain and obstructions, and in the case of the SR-24 LINE LOCATOR available from the present assignee with the use of RIDGID trax, the user can map a line on a satellite generated map via Global Positioning System (GPS).

Within the field of drain cleaning, the process is still relatively blind with the user only receiving feedback from the drain cleaner in the form of a distance and points of interest. Furthermore, customers or premise owners are often interested in the work of the user and information relating to the drain cleaning project. U.S. Pat. No. 7,889,980 discloses the ability to "map" a drain with respect to distance. However, that patent fails to disclose direct communication of the tool to servers along with using overlay mapping of a drain. U.S. Pat. Nos. 8,046,862; 8,276,593; 8,413,347 further describe cable counting but fail to disclose mapping, points of interest, or communication.

Accordingly, a need exists for a system that provides information regarding drain cleaning and inspection, and particularly provides information and detailed reports concerning current and previous cleaning operations and points of interest.

SUMMARY

The difficulties and drawbacks associated with previous approaches are addressed in the present subject matter as follows.

In one aspect, the present subject matter provides a system for providing information regarding drain cleaning or inspection. The system comprises a registration and control component including communication provisions. The system also comprises a drain cleaner including a frame, a motor, a cable carrier, and an electronics assembly having communication provisions enabling data transfer with the registration and control component. And, the system comprises a monitor for presenting information to a user.

In another aspect, the present subject matter provides a method for providing information regarding drain cleaning or inspection. The method comprises providing a system including (i) a registration and control component having communication provisions, (ii) a drain cleaner including a frame, a motor, a cable carrier, and an electronics assembly having communication provisions enabling data transfer with the registration and control component, and (iii) a monitor for presenting information to a user. The method also comprises activating the drain cleaner. The method also comprises sending information from the drain cleaner to the registration and control component. And, the method comprises providing a map viewable on the monitor based at least in part on the information sent to the registration and control component.

In yet another aspect, the present subject matter provides a drain cleaner comprising a frame, a motor supported by the frame, and a cable carrier supported by the frame. The drain cleaner also comprises an electronics assembly that includes GPS provisions for determining a location of the drain cleaner.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The present subject matter provides machines, systems and methods for providing information regarding drain cleaning and inspection. The machines, systems and methods combine various aspects of GPS locating and mapping with distance overlays. The machines, systems and methods promote the collection, reporting, and/or analysis of information pertaining to drain cleaning or inspection. The machines, systems and methods also facilitate communication and information flow from the user to end customers or property owners. In many applications, use of the machines, systems and methods of the present subject matter leads to building better relationships with customers and providing customers a quality end report with a detailed map of the job with a likely cable route or pipe line which can be directly communicated to a central server.

In many versions, the present subject matter machines, systems and methods reduce the number and/or extent of operations in a drain cleaning or inspection project. The machines, systems and methods utilize information that is collected or otherwise obtained and which is utilized in conjunction with a map that visually depicts the project or aspects thereof. Previously, a user would be required to inspect, locate, clean, and then re-inspect the pipe or waste line. The present subject matter machines, systems and methods eliminate one or more previously required operations and provide a visual representation of the project.

In a preferred embodiment, the present subject matter system comprises a drain cleaner having an electronics assembly as described in greater detail herein. The drain cleaner further comprises a frame at which a motor and cable carrier may be attached. Typically, the cable carrier is in the form of a rotatable drum. The motor of the drain cleaner is typically of universal or induction construction allowing a multitude of voltages. Other motor constructions may be utilized such as permanent magnet direct current or brushless direct current. The cable carrier typically comprises an outer carrier and an inner support assembly. The outer carrier houses and/or retains a drain cleaning cable or "snake" as known in the art and the inner support provides structural support and strength for both the carrier and the drain snake. The outer carrier and inner support also comprise pickup devices as those identified in U.S. provisional application Ser. No. 62/592,762 to Schmauder et al. The present subject matter includes a wide array of various configurations for the drain cleaners.

The drain cleaner in the preferred embodiment further comprises a GPS device or assembly which in most versions is directly coupled to the drain cleaner machine. The GPS device is used to identify location information of the machine and time of use of the machine. As described in greater detail herein, the GPS device can be incorporated in the electronics assembly.

Figure 1:
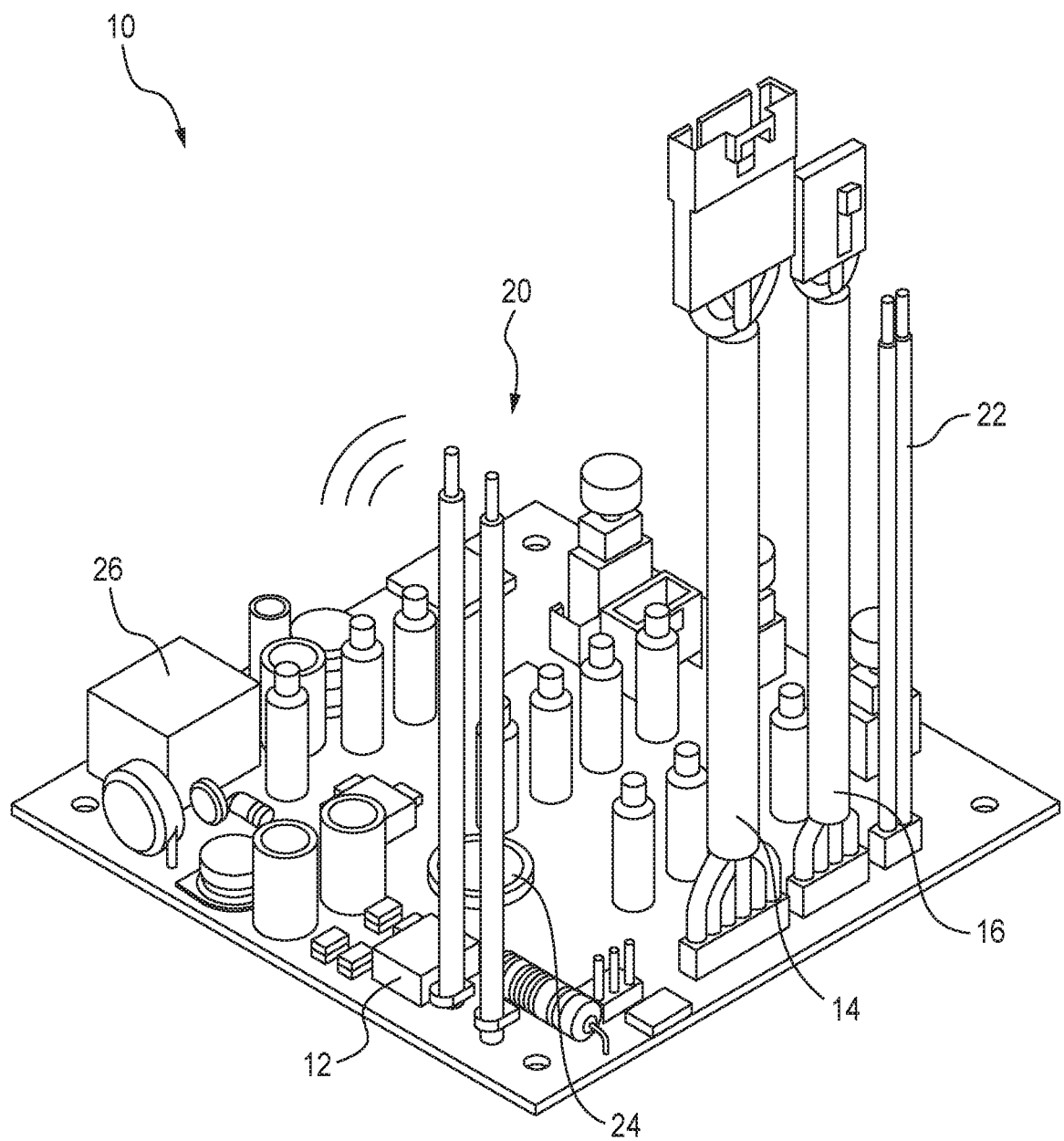
FIG. 1 is a schematic perspective view of an electronics assembly used in embodiments of machines and/or systems of the present subject matter.

FIG. 1 is a schematic perspective view of an electronics assembly 10 used in an embodiment of a drain cleaning system in accordance with the present subject matter. The electronics assembly 10 comprises one or more microprocessor(s) 12; an input harness 14 for receiving input signals from sensors, inputs, and information gathering components of the drain cleaning system; and an output harness 16 for providing output signals or transmissions to the drain cleaning system. It will be understood that a variety of electronic connection components could be used instead or in addition to the noted harnesses. The assembly 10 also comprises a wireless antenna array generally shown as array 20 for receiving one or more signals such as but not limited to GPS signals, WiFi signals, Bluetooth signals and the like. The assembly 10 also comprises power leads 22 for delivering electrical power to the assembly 10. Typically, a low voltage direct current such as 12 VDC is provided to the assembly 10 via leads 22. However, it will be understood that the present subject matter includes a wide array of other configurations using power sources of higher or lower voltages including alternating current power sources. The assembly 10 may additionally include one or more on-board batteries 24 for providing electrical power to the components of the assembly 10. As noted, assembly 10 may also include GPS provisions which determine a location of the electronics assembly and thus of the drain cleaner. The GPS provisions determine location using information from satellites of the Global Positioning System. Such assessing and location determination are known in the art. The assembly 10 typically also comprises a wide range of additional components such as memory provisions, control provisions, operator interface provisions, and the like.

Figure 2:
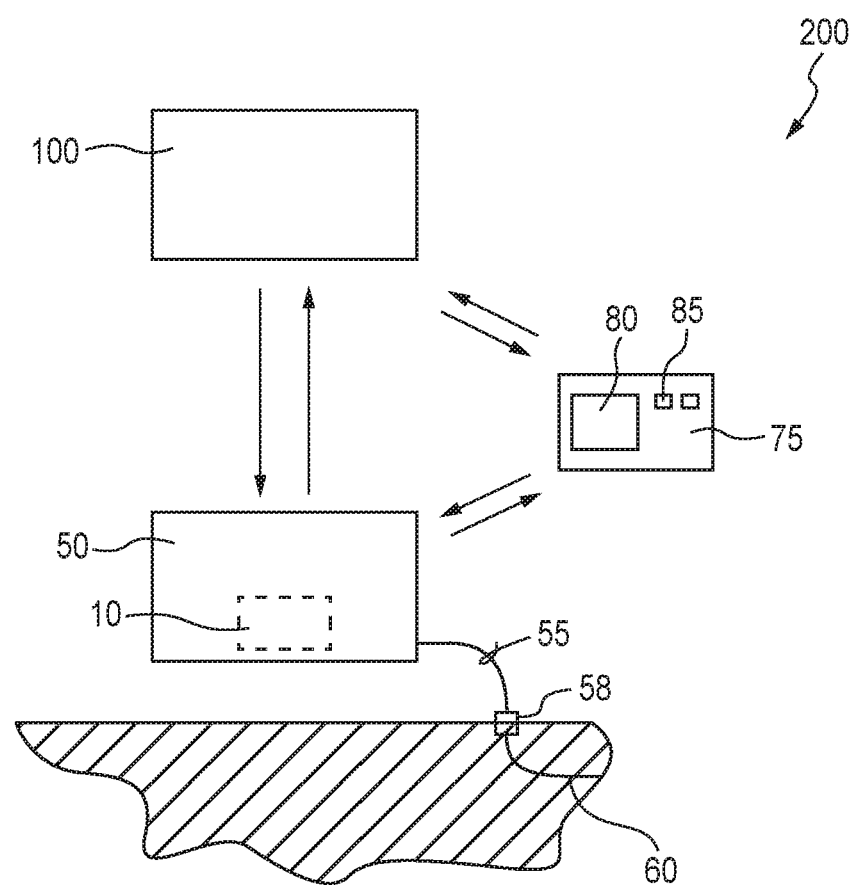
FIG. 2 is a schematic illustration of an embodiment of a system in accordance with the present subject matter.

FIG. 2 is a schematic illustration of an embodiment of a system 200 in accordance with the present subject matter. The system 200 comprises a drain cleaner 50 having the previously described electronics assembly 10. The drain cleaner 50 is in communication with at least one server or registration and control component 100. The drain cleaner 50 is also in communication with an operator station 75 which typically includes a monitor 80 for presenting information to the user. And in many versions, the operator station 75 is in communication with the registration and control component 100. The monitor is typically a screen or panel of light emitting components configured to present visual information such as graphics, video, and/or text to a user. Combinations of such information are also contemplated. The operator station 75 can also include one or more switches, controls or other input provisions generally denoted as 85 for controlling or otherwise enabling the user to govern operation of the drain cleaner 50. It will be understood that the operator station 75 can be separate from the drain cleaner 50 as shown in FIG. 2, or can be incorporated or integral with the drain cleaner 50. FIG. 2 additionally illustrates a drain cleaning cable 55 extendable and/or retractable relative to the drain cleaner 50. The cable 55 is shown as positioned within a drain line 60 and through a trap 58 for example.

The registration and control component 100 receives information and data, retains information and data, may be configured to administer access and use permissions, and govern user access to, and use of, drain cleaners 50 registered with the system 200. The registration and control component in many embodiments of the present subject matter is provided by one or more computer servers or units which may be remotely located. As described herein, typically the one or more registration and control component(s) is accessed via the internet and can include cloud-based storage, processing, and/or communication.

The registration and control component 100 includes a database and/or data storage provisions in which user information is retained. Nonlimiting examples of such information include user name; registrant name if different than the user name; company or organization name; contact information of user, registrant, and/or company; date of initial registration of user and/or drain cleaner(s) and optionally dates of subsequent registrations or logins; password(s) and other confidential information relating to the user, registrant, and/or company; designation or status of the user, registrant, and/or company, e.g., industrial, contractor, builder, or home user; location of registered user and/or drain cleaner; preset or predesignated drain cleaner parameters; actual use-based drain cleaner parameters; warnings or indicators associated with registered drain cleaners and/or users; status of warnings or indicators; and a wide array of other information and data such as the IP address used to register the drain cleaner or to enable operation of the drain cleaner.

The registration and control component 100 may include communication provisions so that the component can exchange, transmit, and/or receive information or data from/ to the one or more drain cleaners 50. As previously noted, the registration and control component can in many versions, also exchange, transmit, and/or receive information or data from/to the associated operator stations 75. In many embodiments of the present subject matter, the registration and control component 100 includes internet communication provisions.

In many versions of the present subject matter, the systems and particularly the registration and control component use cloud-based storage and/or cloud-based processing and thus can be accessed and implemented in a distributed fashion using remotely located servers or other computers. Typically such servers, computers or other devices are accessed via the internet.

Cloud-based storage and/or processing refers to online storage and/or processing by which data is virtually stored and/or processed across one or multiple servers, which are typically hosted by service providers. The term "cloud-based computing" refers to one or more of cloud-based data storage, cloud-based data processing, and/or cloud-based data communication. The service providers may include data center operators, which virtualize resources based on customer requirements. The storage services may be accessed via web service application programming interfaces (API) or via web-based user interfaces (UI). Cloud-based computing is described in the prior art such as for example in WO 2013/141868; US 2012/0060165; WO 2013/119247; and US 2011/0153868.

Figure 3:
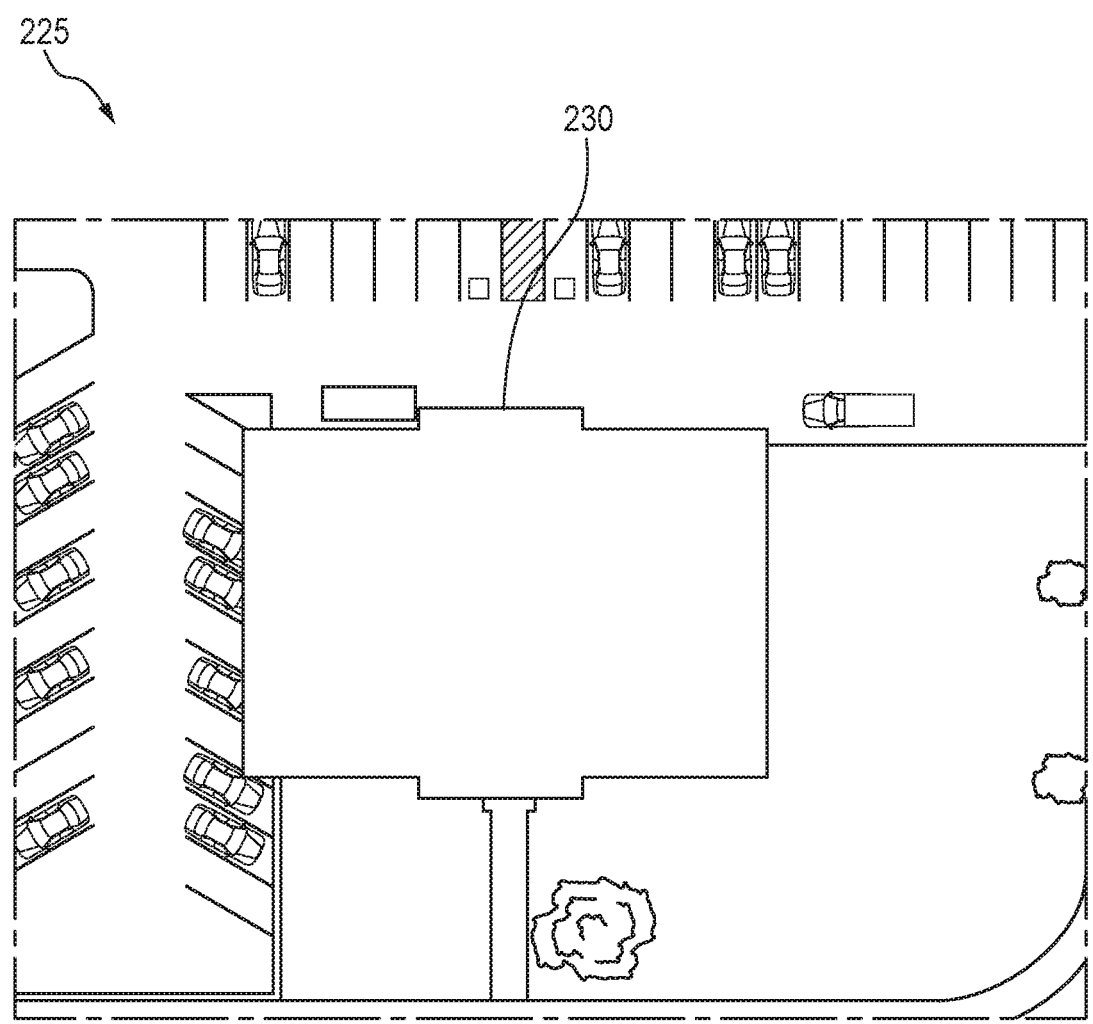
FIG. 3 is a representative map provided by an embodiment of the system of the present subject matter.

FIG. 3 is an example of an initial GPS generated map 225 that is shown or otherwise presented on the monitor 80 at an initial phase of a drain cleaning or inspection project in accordance with the present subject matter. In many applications, the map is relatively detailed and is in the form of a photograph such as from a satellite image, or as a schematic representation of the local area at which is located the drain cleaner 50. The map 225 can for example show or otherwise represent a building 230 with adjacent features. For example, the adjacent features may depict trees, bushes, vehicles, other buildings or structures, roads, lanes, parking lots, and the like. These features may be captured on a photograph or may be schematically depicted on a non-photographic map.

Figure 4:
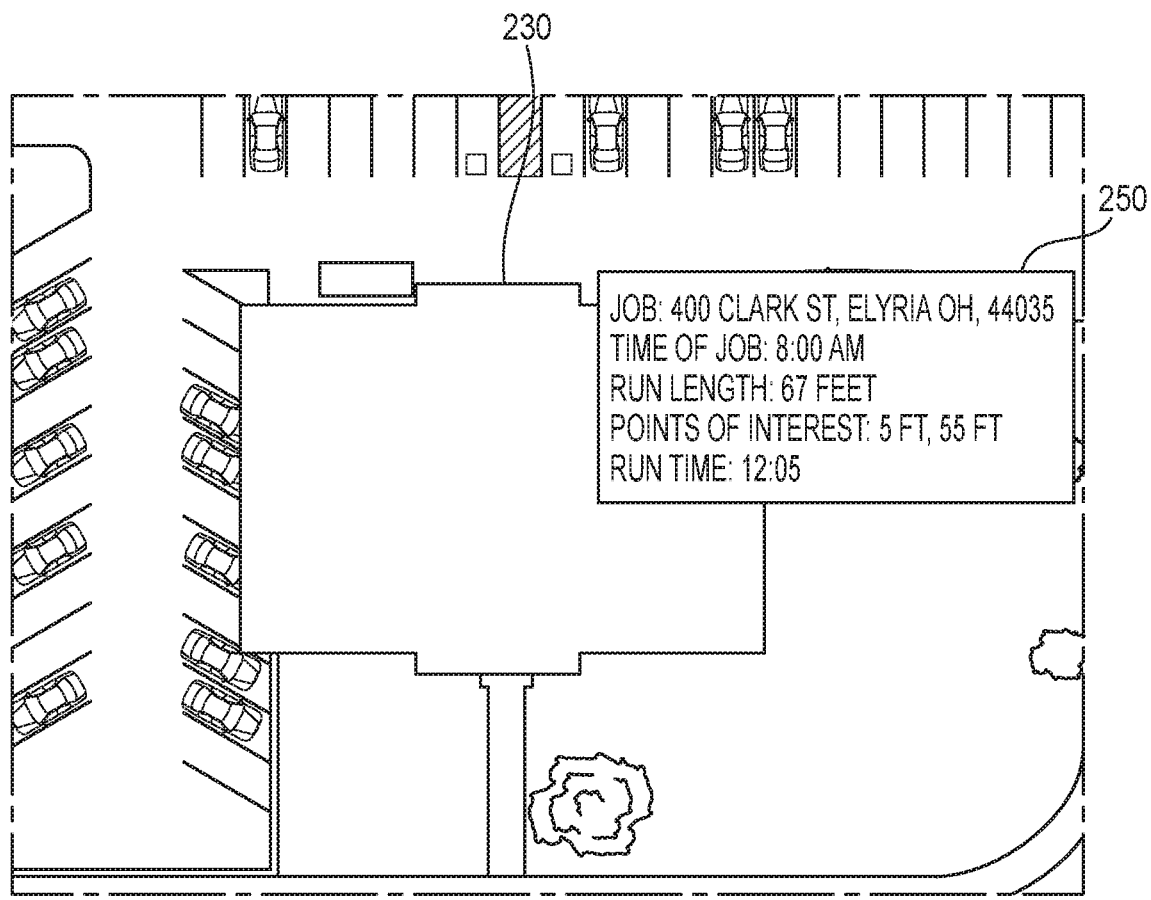
FIG. 4 is a modified map of the map of FIG. 3 provided by the noted embodiment of the system.

In many embodiments, the drain cleaner such as drain cleaner 50 and/or its electronics assembly 10, also comprises communication provisions typically in the form of a cellular chip, likely in the range of 3G or 4G but not limited to such bandwidths. As shown in FIG. 1, the cellular chip 26 is typically directly coupled to the drain cleaner and/or the electronics assembly 10 and is in communication with the registration and control component 100 or other host server(s). The cellular chip 26 uploads pertinent drain cleaner machine information such as but not limited to job location, length of run, points of interest, and run time. The communication provisions enable data transfer between the drain cleaner 50 and the registration and control component 100. Upon receipt of such information, the registration and control component 100 can summarize and/or present an overlay of information on the map. FIG. 4 is an example of the map of FIG. 3 with additional information such as pertinent drain cleaner information and/or information from the registration and control component 100, i.e., the host server(s), provided on the map for convenient review by the user. The modified map of FIG. 4 includes for example a summary 250 of such information.

As previously described, the system also comprises one or more registration and control components or host server(s) capable of importing the machine information and storing the information for the user. In many versions, the host server further comprises an internal program that compiles the information from the user to provide a detailed output or report. The program can further comprise an internal predictive algorithm that reviews the data provided by the drain cleaner machine and the surrounding satellite imagery to identify a likely direction and traversal of the piping system. The program can also generate graphic imagery such as in the form of drain lines, pipe lines, traps or access components into the drain or pipe lines, industrial components such as pumps, filters, and the like, buildings or building features, architectural features, and/or naturally occurring features such as trees, waterways, and the like.

Figure 5:
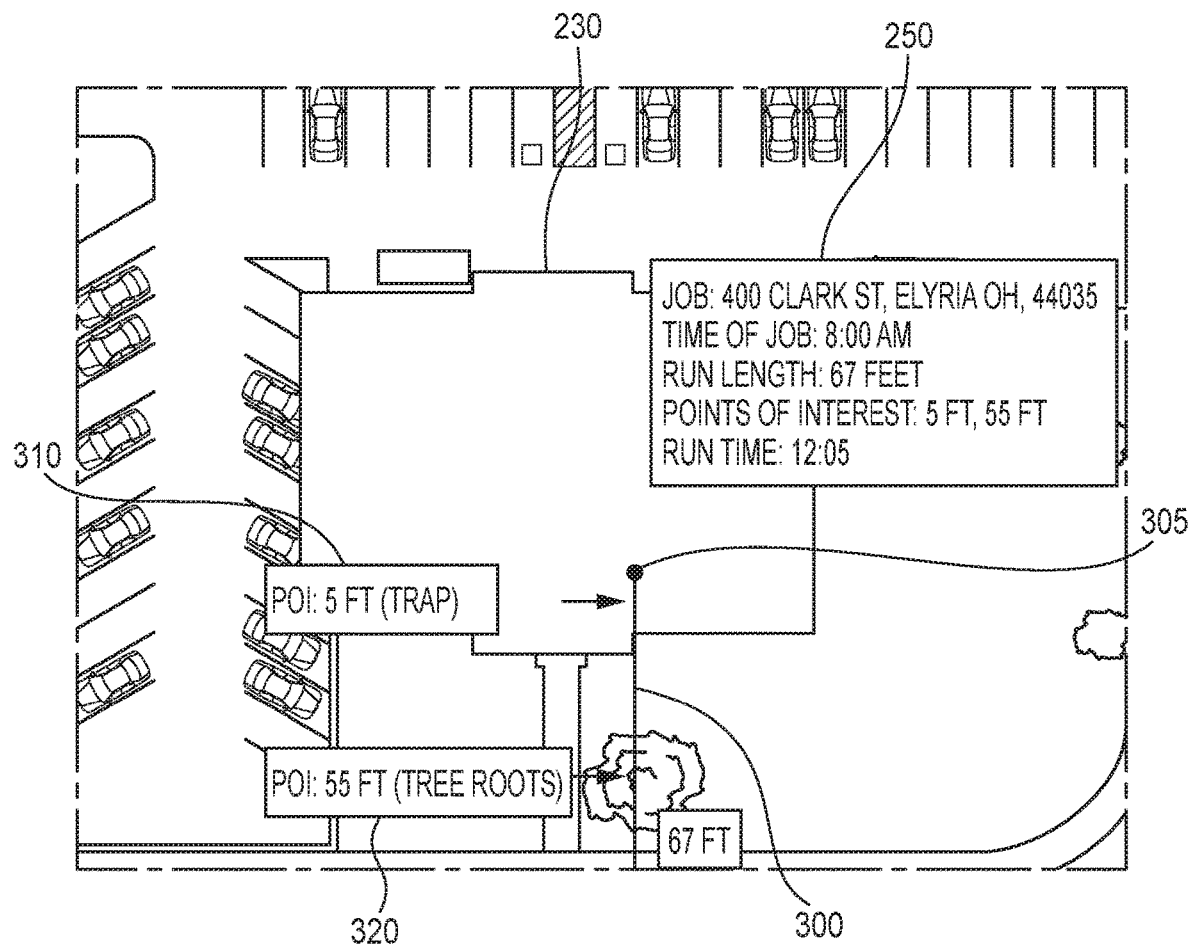
FIG. 5 is the modified map of FIG. 4 with various generated imagery overlaid thereon in accordance with an embodiment of the present subject matter.

FIG. 5 illustrates the modified map of FIG. 4 with generated imagery overlaid thereon depicting the piping of interest shown as piping 300. The generated imagery may also include one or more tags or points of interest (POI) such as a location 305 of the drain cleaner, a trap 310, and tree roots 320. The present subject matter includes combinations of these POIs.

The modified map with generated imagery and/or related report(s) are accessible through a user portal which connects a user to the server, for example the registration and control component 100, which hosts the information and jobs. The modified map with generated imagery and/or related report(s) may also be transmitted or otherwise provided to the end customer or other party for record keeping purposes.

Figure 6:
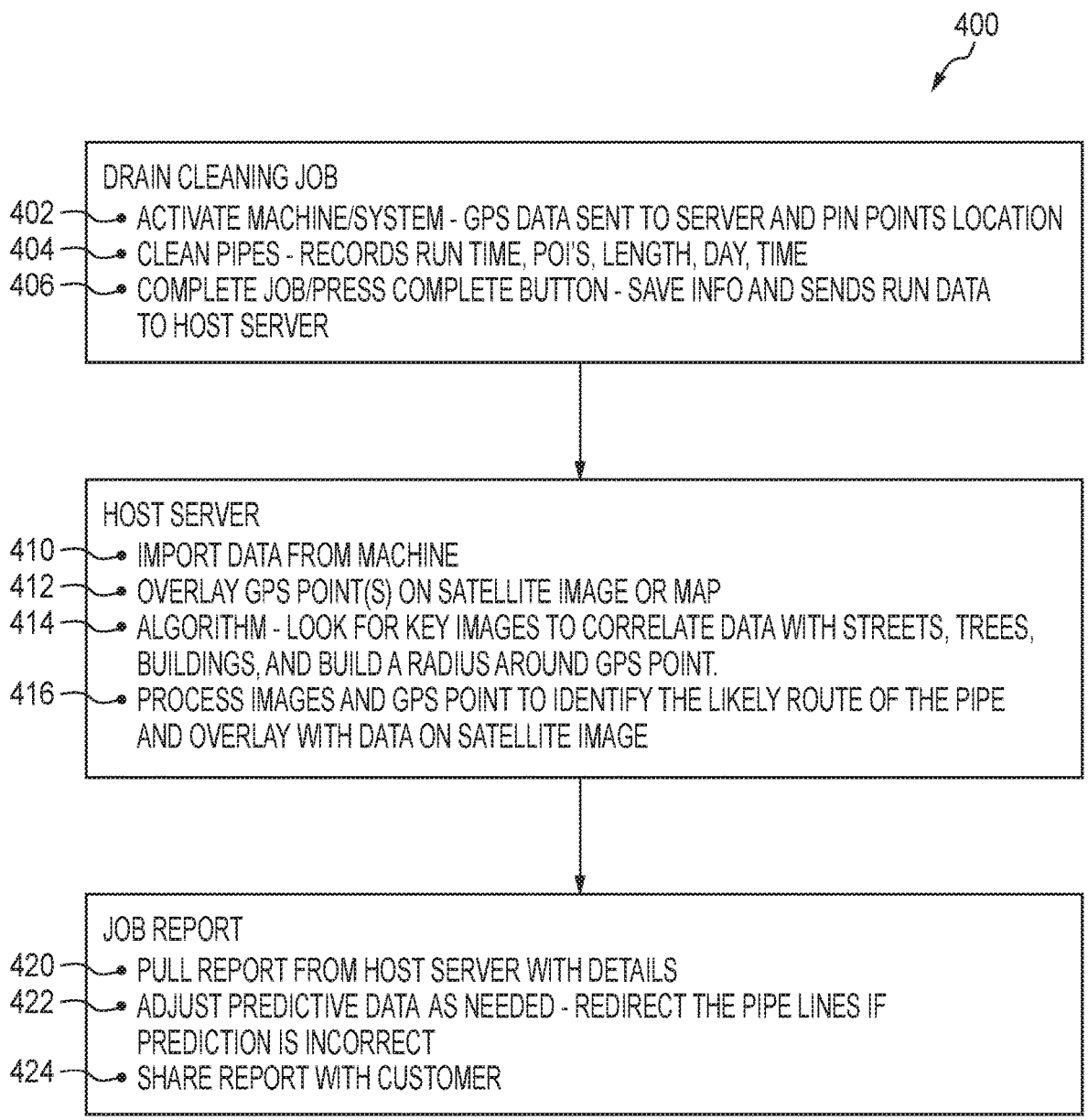
FIG. 6 is a schematic flowchart showing an embodiment of a method in accordance with the present subject matter.

FIG. 6 schematically illustrates a method 400 using the previously described system 200 depicted in FIG. 2. Upon activating the drain cleaner 50 and/or the system 200, GPS data collected at the drain cleaner 50 is sent to the server 100 and includes information relating to location of the drain cleaner 50. This operation is shown as operation 402. During the pipe cleaning or blockage removal process, the drain cleaner 50 collects and stores information such as run time, location of one or more POIs, length of cable advanced, day and time information. This is shown as operation 404. Upon completion of the pipe cleaning or blockage removal, the user confirms completion typically by actuation at the drain cleaner 50. This actuation stores information collected during the pipe cleaning or blockage removal and sends the information to the registration and control component or server 100. This operation is shown as operation 406. Operations 402, 404, and 406 are typically performed or primarily performed at the drain cleaner 50.

The host server such as server 100 shown in FIG. 2, imports/exports data or information from the drain cleaner 50. This data transfer generally includes the forwarding of GPS information from previously noted operation 402 and sending information concerning job completion and run data from previously noted operation 406. The transfer of data is denoted as operation 410 in FIG. 6. The host server 100 may also be configured to overlay GPS point(s) or data on a map which typically shows the local area around the location of the drain cleaner 50. The map may be a photograph or schematic illustration. This operation is shown as operation 412. As previously described, the host server is also configured to assess and/or identify key images on the map that correlates with streets, trees, buildings, and the like. The host server may utilize a pre-selected or predetermined radius around the location of the drain cleaner 50 to define the area on the map for assessing or identifying the noted key images. These operations are shown as operations 414. The host server 100 can also be configured to generate imagery and overlay the imagery on the map. This may involve determining a likely location and direction or orientation of piping of interest. In addition, the server 100 may generate and/or overlay tags which include identifying information such as text or labels for various items on the map such as the noted streets, trees, buildings, and the like. These operations are shown as operation 416.

The method 400 also typically comprises generating one or more job reports. A job report can be provided at the server 100, which is shown as operation 420. Provisions can also be provided typically at the server 100 for adjusting or modifying the direction and/or orientation of the piping 60 or piping 300 depicted on the map. This is shown as operation 422. The method 400 can also include one or more operations 424 involving sharing the job report(s) and/or maps with the customer or premises owner.

As noted, in certain embodiments, the system and particularly the host server or registration and control component can be configured to run a predictive algorithm that can predict or estimate a location, series of locations, direction(s), orientation(s), and/or other aspects of a drain line or pipe line. Specifically, the system can utilize predictive analytics. For example, in most city settings, drains and sewer systems are alongside the street. Therefore, the system looks for streets and predicts that the location of the drain cleaner in reference to the street creates a relatively straight line and the overlay can be made. Likewise, it is also contemplated that in city settings with a GPS unit, elevation can be obtained and the system can predict that the user of the machine is on the 5th floor of an apartment building and if the cable travels 50 feet, it is likely going straight down. The present subject matter also includes the use of public utilities maps and building documents available to the public. By cross-referencing those documents, the system can piece key reference points together to overlay a drainage system on a satellite image and improve the accuracy of the system.

Previous processes to locate lines and points of interest have included sending a camera down a pipe line, energizing the line, and then using a locater to trace out the line. If a drain cleaning is also needed, the user must now clean the drain and hope that all items have been cleaned.

The present subject matter aims to limit the need for repetitive steps and provide a detailed report for an end user clearly identifying the likely route of a pipe system and any point(s) of interest.

A detailed report provides both the cleaning company and the building or property owner a clear picture or visual presentation on which they can rely on for subsequent jobs. Likewise, the data could be used to further map the drain infrastructure.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A system (200) for providing information regarding drain cleaning or inspection, the system (200) comprising:
   a registration and control component (100) including communication provisions, wherein the registration and control component (100) includes provisions for data entry and storage and/or data processing including cloud-based storage and/or processing; and
   a drain cleaner (50) including a drain cleaning cable (55) extendable and retractable relative to the drain cleaner (50) and an electronics assembly (10) including communication provisions for enabling transfer of data involving extension or retraction of the cable (55) relative to the drain cleaner (50) in relation to cleaning or inspection of a drain, wherein said transfer of data is between the drain cleaner (50) and the registration and control component (100),
   wherein the electronics assembly (10) is configured to provide to a user visual information based at least in part upon said data involving extension or retraction of the cable (55) relative to the drain cleaner (50), and
   wherein the visual information includes at least one point of interest (POI).

2. The system (200) of claim 1, wherein the at least one point of interest (POI) is selected from the group consisting of a location of the drain cleaner (50), piping of interest, a trap (58), a bend, tree roots or another obstruction, and combinations thereof.

3. The system (200) of claim 1, wherein the communication provisions of the electronics assembly (10) include a chip (26).

4. The system (200) of claim 3, wherein the chip (26) is configured to provide information regarding the drain cleaner (50) including
   job location;
   length of run;
   cable length and diameter used;
   additional points of interest (POIs); and/or
   run time.

5. The system (200) of claim 1, wherein the electronics assembly (10) includes at least one microprocessor (12).

6. The system (200) of claim 1, wherein the electronics assembly (10) includes at least one microprocessor (12) configured to receive and/or process satellite-provided data for determining location of the drain cleaner (50).

7. The system (200) of claim 1, wherein the electronics assembly (10) includes a GPS device configured to receive and process data from the drain cleaner (50) for providing information regarding the drain cleaner (50) including location and/or time-of-use of the drain cleaner (50) to a user.

8. The system (200) of claim 1, wherein the electronics assembly (10) includes an antenna array (20).

9. The system (200) of claim 8, wherein the antenna array (20) is configured to receive one or more signals selected from the group consisting of GPS signals, WiFi signals, Bluetooth signals, and combinations thereof.

10. The system (200) of claim 1, including a monitor (80) for providing and presenting preselected information regarding the drain cleaner (50) to a user.

11. The system (200) of claim 10, wherein the information provided by the monitor (80) is selected from the group consisting of graphic information, video information, textual information, and combinations thereof.

12. The system (200) of claim 1, wherein the electronics assembly (10) includes additional provisions for collecting and storing data involving drain cleaning and/or drain inspection information selected from the group consisting of run time, location of one or more POIs, length-of-cable advanced and/or retracted, day-and-time information, and combinations thereof.

13. A method for providing visual information regarding drain cleaning and/or drain inspection to a user, wherein the method comprises:
  providing a system (200) including
    (i) a registration and control component (100) including communication provisions, wherein the registration and control component (100) is configured for data storage and/or data processing including cloud-based storage and/or cloud-based processing, and
    (ii) a drain cleaner (50) including a drain cleaning cable (55) extendable and retractable relative to the drain cleaner (50) and an electronics assembly (10) including communication provisions for enabling transfer of data involving extension or retraction of the cable (55) relative to the drain cleaner (50) in relation to cleaning or inspection of a drain, wherein said transfer of data is between the drain cleaner (50) and the registration and control component (100);
  activating the drain cleaner (50);
  passing information between the drain cleaner (50) and the registration and control component (100);
  providing visual information viewable by the user, wherein the visual information is based at least in part on the information passed between the drain cleaner (50) and the registration and control component (100), and
  determining at least one point of interest (POI) from the information passed between the drain cleaner (50) and the registration and control component (100).

14. The method of claim 13, wherein the information passed between the drain cleaner (50) and the registration and control component (100) includes location information involving the drain cleaner (50).

15. The method of claim 13, wherein the at least one point of interest (POI) is selected from the group consisting of a location of the drain cleaner (50), certain piping of interest, a trap (58), a bend, tree roots or another obstruction, and combinations thereof.

16. The method of claim 13, including generating imagery based upon the information passed between the drain cleaner (50) and the registration and control component (100).

17. The method of claim 16, including overlaying the generated imagery on the visual information.

* * * * *